Oct. 25, 1932.  E. H. REMDE  1,884,862
INDUSTRIAL TRUCK
Filed Sept. 7, 1929  5 Sheets-Sheet 1
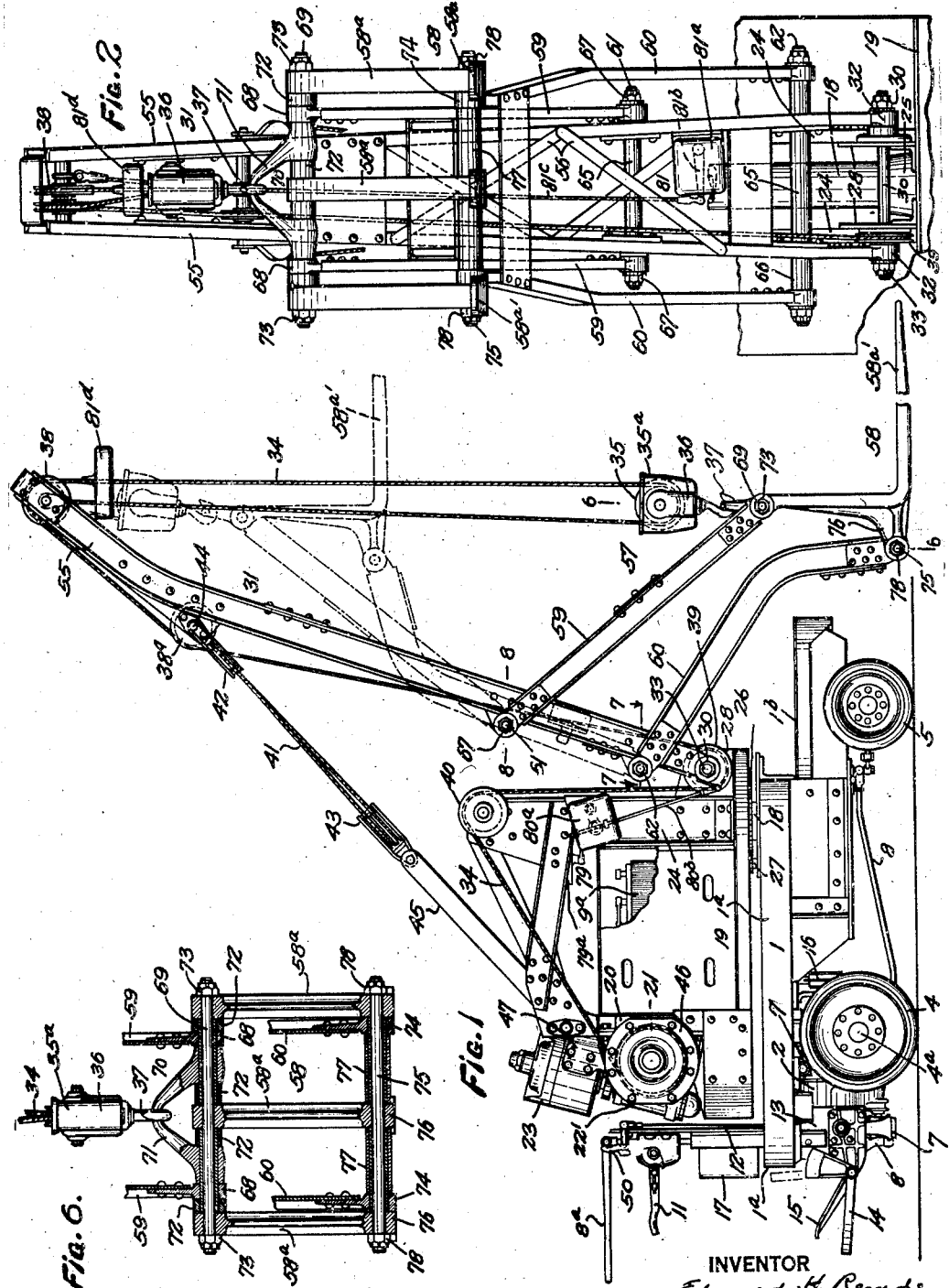
INVENTOR
Edward H. Remde
BY Geo. B. Pitts
ATTORNEY

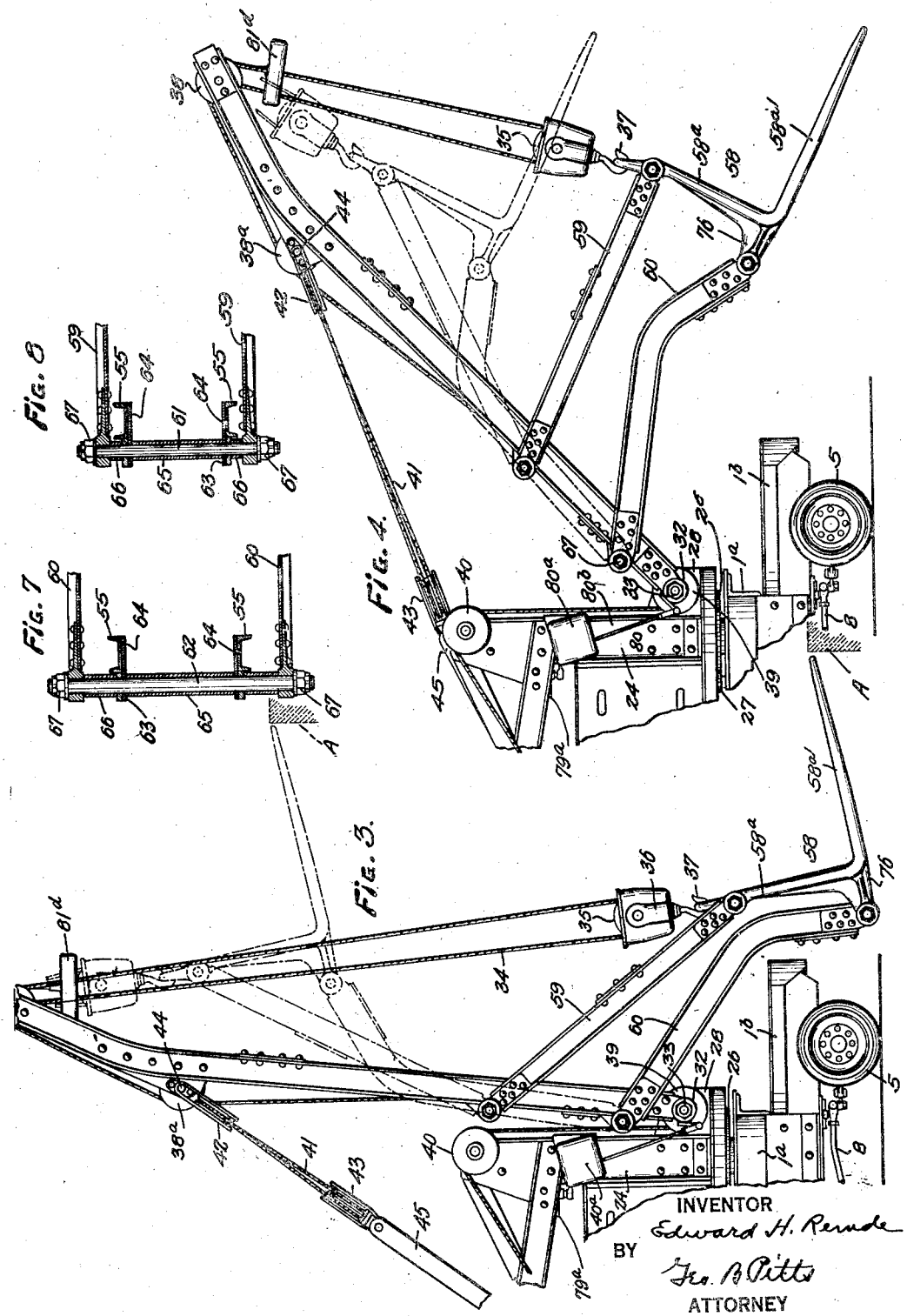

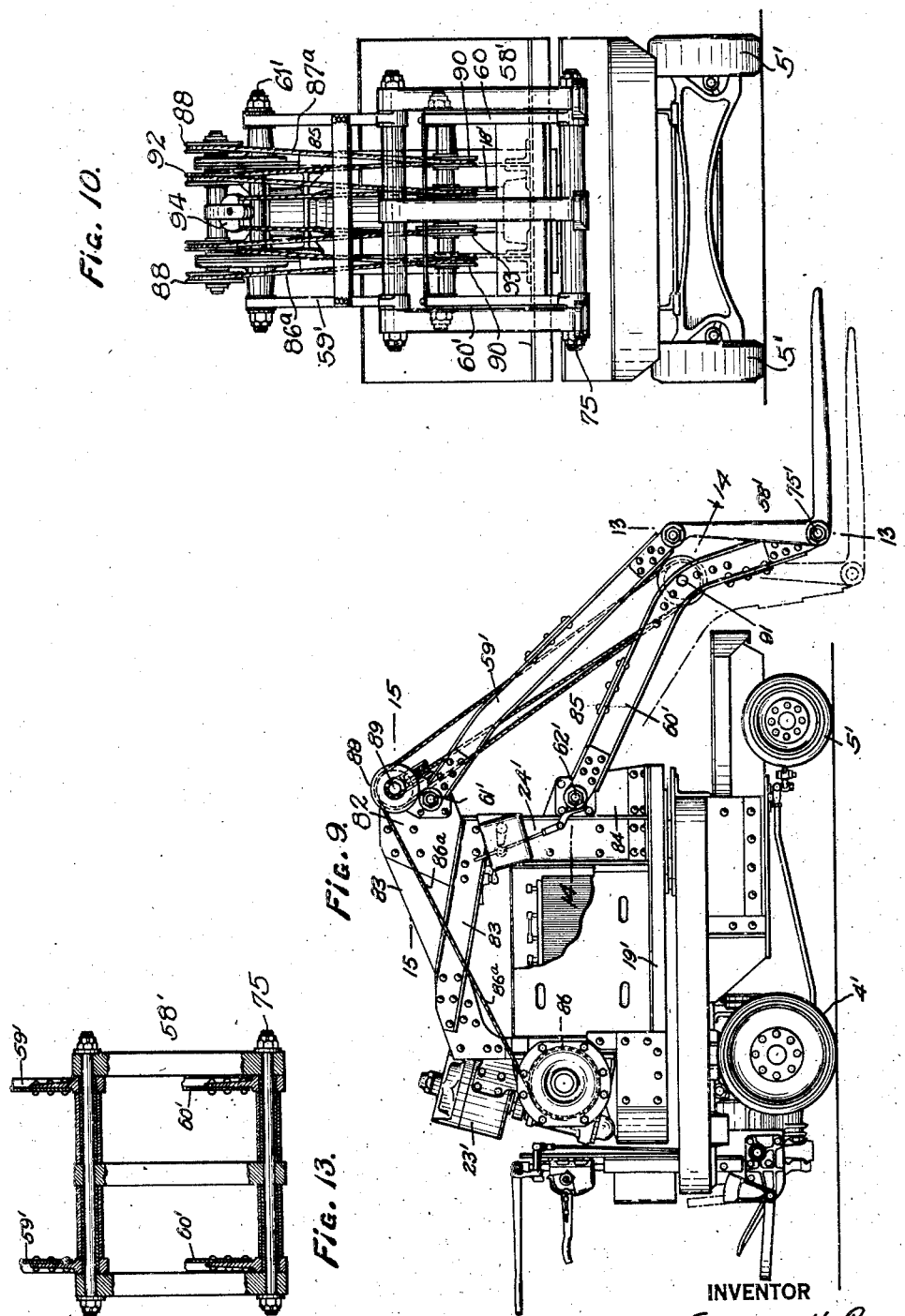

Oct. 25, 1932.  E. H. REMDE  1,884,862
INDUSTRIAL TRUCK
Filed Sept. 7, 1929  5 Sheets-Sheet 5
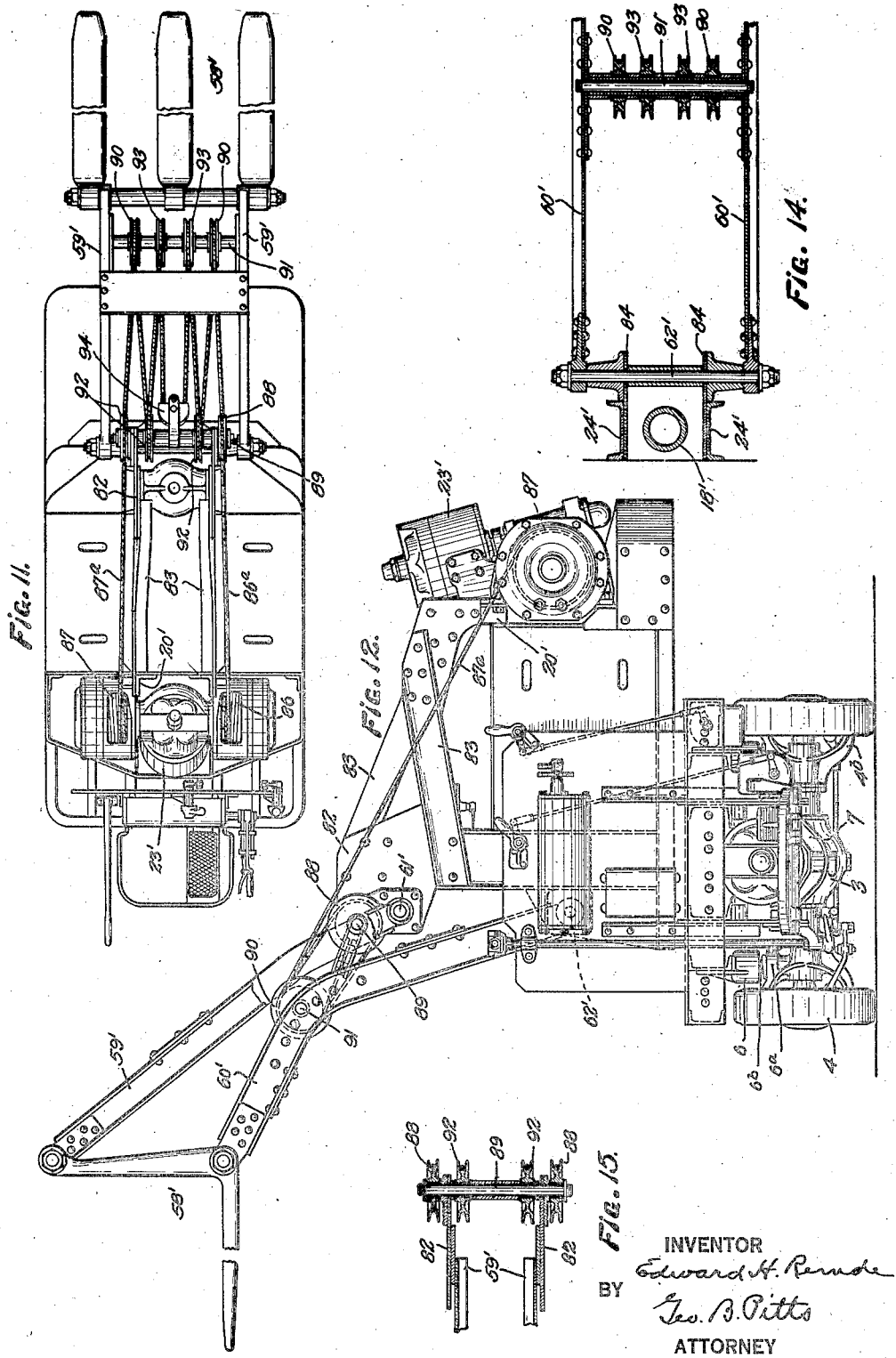
INVENTOR
Edward H. Remde
BY
Geo. B. Pitts
ATTORNEY Patented Oct. 25, 1932

1,884,862

UNITED STATES PATENT OFFICE

EDWARD H. REMDE, OF CLEVELAND, OHIO, ASSIGNOR TO THE BAKER-RAULANG COMPANY, OF CLEVELAND, OHIO, A CORPORATION OF OHIO

INDUSTRIAL TRUCK

Application filed September 7, 1929. Serial No. 390,954.

This invention relates to an industrial truck, more particularly to a truck of the tiering type capable of picking up loads and elevating them to a relatively high position and lowering them from such position to a lower position and discharging them.

One object of the invention is to provide a truck of this character that is relatively simple and easily operated and controlled.

Another object of the invention is to provide a truck construction having an improved load raising and lowering mechanism which may be positively actuated to facilitate loading or discharge of the loads, whereby these operations may be carried out in a rapid and ready manner.

A further object of the invention is to provide an improved mounting for the load raising and lowering mechanism whereby loads may be handled in a rapid manner under varying conditions.

Other objects of the invention will be apparent to those skilled in the art to which my invention relates from the following description taken in connection with the accompanying drawings, wherein Fig. 1 is a side view of a truck embodying my invention, parts being broken away.

Fig. 2 is a fragmentary front view of the parts shown in Fig. 1, but showing the load carrying member in elevated position.

Fig. 3 is a fragmentary side view showing (a) in full lines the load carrying member in its lowered position and inclined upwardly to permit a load to be rolled or slid on it and (b) in dotted lines the load carrying member in a raised position and inclined to permit a load to be rolled or slid on to it.

Fig. 4 is a view similar to Fig. 3 showing the positions of the load carrying member when discharging loads in a lowered or raised position.

Fig. 6 is a section on the line 6—6 of Fig. 1.

Figure 5:
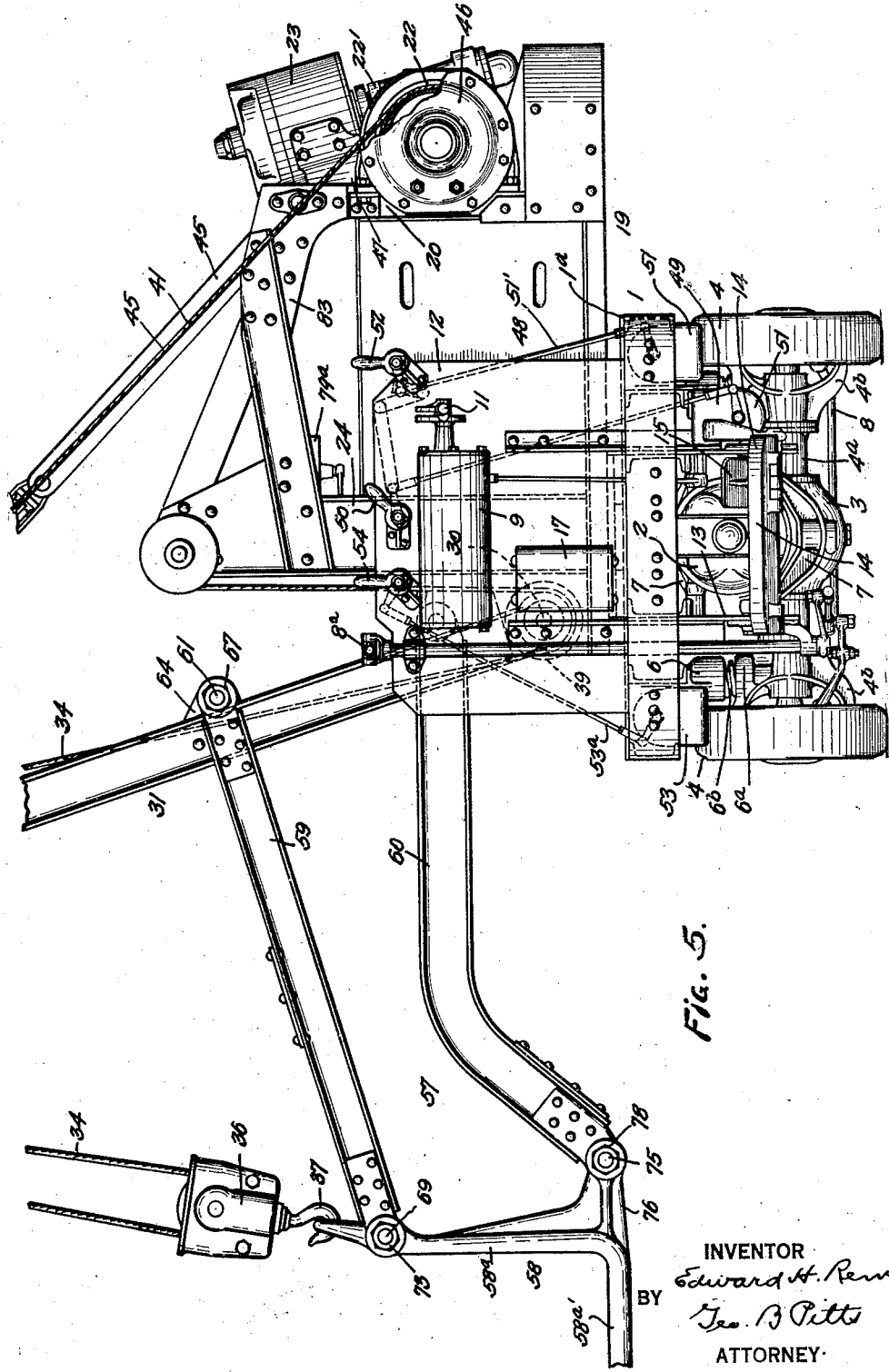
Fig. 5 is a rear end view of the parts shown in Fig. 1, but showing the frame which supports the load engaging, lifting and transporting mechanism slewed to one side of the main frame.

Figs. 7 and 8 are fragmentary sections on the lines 7—7 and 8—8, respectively, of Fig. 1.

Fig. 9 is a side elevation of a truck embodying my invention, but of a slightly different form of construction.

Fig. 10 is a front view of the parts shown in Fig. 9, but showing the load carrying member in a raised position.

Fig. 11 is a plan view of the parts shown in Figs. 9 and 10.

Fig. 12 is a rear end view of the parts shown in Fig. 9, but showing the frame which supports the load carrying and operating mechanism slewed to one side of the main frame.

Fig. 13 is a section on the line 13—13 of Fig. 9.

Fig. 14 is a fragmentary section on the line 14—14 of Fig. 9.

Fig. 15 is a fragmentary section on the line 15—15 of Fig. 9.

In the drawings, 1 indicates a frame mounted on suitable wheels, certain of which are driven by a motor 2, transmitting power through a suitable transmission mechanism within a housing 3. The frame preferably comprises an elevated section 1a and a drop section 1b. In this form of construction a pair of relatively large wheels 4 are arranged below the elevated section 1a and relatively small wheels 5 are arranged below the drop section. In this arrangement the wheels 4 serve as the traction wheels driven by the transmission mechanism.

4a indicates the axle for the wheels 4, terminating in suitable knuckles 4b, to which the wheels 4 are pivoted. 6, 6a indicate seats carried by the frame section 1a and axle 4a for coiled springs 6b. 7 indicates a suspension mechanism for the motor 2 and housing 3 and comprising a pair of U-members.

The suspension mechanism is preferably similar to that shown and claimed in Letters Patent No. 1,628,145, dated May 10, 1927. 8 indicates a steering gear preferably connected to both pairs of wheels 4, 5, and simultaneously steering them about a common center by means of a manual steering device 8a. 9 indicates a suitable controller for completing the circuits to the motor, current being supplied by suitable batteries 9a. The controller 9 is connected to an operating lever 11, supported on an upright portion 12 of the frame 1a. 13 indicates brackets depending from the outer end of the frame section 1a and arranged to pivotally support a platform 14 for an operative. 15 indicates a foot pedal associated with the platform 14 and connected through a linkage to control a brake mechanism 16 which is normally biased into braking position by a spring as is customary in trucks of this general character. 17 indicates a switch mechanism which is connected to the foot pedal 15 or the linkage operated thereby to automatically open or close the motor circuit, the latter being open when the brake is set and closed when the brake is released by the pushing down of the foot pedal 15.

18 indicates a vertical shaft suitably mounted at its lower end on the frame section 1a. 19 indicates a frame swingably mounted at its front portion on the shaft 18. The frame 19 includes a base portion for supporting the batteries 9a, uprights 20 for supporting a pair of cable winding drums 21, 22, a power mechanism 22′ therefor and a motor 23 for the power mechanism and uprights 24 which support an upper bearing engaging the shaft 18 and co-operating with a bearing 25 at the front end of the base portion to rotatably support the frame 19 on the shaft. The frame 19 carries a gear 26 with which a pinion meshes, the pinion being fixed to a shaft 27 which is driven by a motor, supplied with current from the batteries 9a, the motor, its mounting and driving means being preferably similar to corresponding parts shown in my application Serial No. 679,605, filed December 10, 1923.

28 indicates standards mounted on the front end of the base portion of the frame 19 and provided with suitable bearings for a shaft or pivot pin 30 serving as the pivot or fulcrum for a support indicated as an entirety at 31. As shown, the pin 30 extends through suitable knuckles 32 on the lower end of the support 31 and carries nuts 33 at its ends to hold the pin against endwise movement. 34 indicates a cable anchored at its outer end to the upper end portion of the support 31 and depending downwardly to form a suspension loop which engages a sheave 35 mounted in a yoke 36. The yoke 36 carries a raising and lowering element, such as a hook 37. The other leg of the cable loop reeves over a sheave 38 suitably supported on the outer end of the support 31. From the sheave 38, the cable 34 extends to and over a guide sheave 38a and then to and around a sheave 39 loosely mounted on the pin 30. From the sheave 39 the cable extends to and around a sheave 40 suitably mounted on the adjacent upright 24 or an extension thereof and from the latter sheave the cable extends to the winding drum 21, the operation of which will serve to raise or lower the hook 37 depending on its direction of rotation.

41 indicates a cable connected at its inner end to and adapted to wind on and off the drum 22. The cable 41 is operatively connected to the upper portion of the support 31 and operates to swing the latter about its pivot pin 30 according to the direction of rotation of the drum 22. The cable 41 reeves through or around a pair of multi-type of pulley blocks 42, 43, the former being pivotally connected at 44 to the upper portion of the support 31 and the latter being pivotally connected through a pair of links 45 to the frame 19.

The drums 21, 22, are mounted in suitable casings 46 fixed to a support 47 which carries the motor 23 and the power mechanism driven thereby, the support being suitably fixed to the uprights 20. The drums are fixed to shaft sections connected to and driven by the power mechanism 22′. The power mechanism is of the differential type, the ring gear of which is preferably a worm gear in mesh with a worm fixed to the shaft of the motor 23. Both drum shafts are normally locked against rotation by separate clutches, either of which may be disconnected or released by a selective mechanism, indicated as an entirety at 48, so that upon the operation of the motor 23, the latter will transmit power through the differential mechanism to rotate the shaft so released and the adjacent drum. By providing separate clutches and releasing mechanisms such as just described, either drum may be rotated at the will of the operative. 49 indicates a controller for the motor 23 arranged to close the circuit thereto to drive it in either direction. The shaft of the controller is connected by a suitable linkage to an operating handle 50. The means for releasing each clutch is preferably of the electro-magnetic type, for which reason the selective mechanism includes a suitable switch 51, which is connected by suitable linkage 51′ to a handle 52.

The construction of the drums 21, 22, power mechanism therefor, driving motor 23, clutches for holding the drums, the magnetic release means for the clutches and the selective mechanism forms the subject-matter of my said co-pending application Serial No. 679,605, for which reason no claims to this subject-matter are made herein.

By rotating either drum 21, 22, it will be seen that the support 31 may be swung about its pivot or the load engaging member 37 may be raised or lowered.

53 indicates a controller for the motor (not shown) which rotates the frame 19. The shaft of the controller 53 is connected by a linkage 53a to an operating handle 54.

The support 31 preferably comprises a pair of channels 55 suitably connected by cross members 56 and it extends upwardly to a considerable height so that the device 37 may raise the load carrying member to relatively high positions.

57 indicates as an entirety mechanism for engaging, lifting and transporting a load, this mechanism including a load carrying member 58. In the form of construction shown in Figs. 1 to 8, this mechanism is mounted upon a movable support, to wit, the support 31 and combined with the raising and lowering element or device 37, so that operation of the latter serves to raise and lower the load engaging, lifting and transporting mechanism and operation of the former serves to tilt or incline the load carrying member 58, whereby the latter may be positioned to (a) receive loads by sliding or rolling the latter from its support thereonto, as shown in Fig. 3, or (b) discharge loads by causing them to slide or roll off such member, as shown in Fig. 4. The load engaging and carrying member 58 may be constructed to engage, receive and carry loads of different shapes, but in the form illustrated in the drawings it comprises an L-shaped device, preferably consisting of three elements 58a mounted in fixed, spaced relation (as will later appear), the outwardly extending portions 58a' of which co-operate to support a load. Referring to the load engaging, lifting and transporting mechanism, 59—59, 60—60, indicate upper and lower pantographic pairs of spaced arms, the former being pivoted at their inner ends on a shaft 61 and the latter being pivoted at their inner ends on a shaft 62. Each shaft 61, 62, extends through suitable openings 63 formed in plates 64, by which the shaft is supported, the plates 64 being suitably secured to the inner faces of the channels 55, as shown in Figs. 7 and 8. A sleeve 65 surrounds each shaft between the plates 64 and sleeves 66 surround each shaft between the plates 64 and the adjacent arms to space the latter from the plates. Nuts 67 are provided on the outer ends of each shaft and co-operate with the sleeves 66 to prevent its endwise movement. The outer ends of the arms 59 are provided with suitable knuckles 68 through which a pivot pin or shaft 69 extends, this shaft also extending through aligned openings formed in the upright portions of the elements 58a (see Fig. 6) and serving to pivotally connect the arms 59 thereto. Between the knuckles 68 is a yoke 70 pivoted on the pivot pin or shaft 69, its intermediate portion forming an eye or loop 71 to which the hook 37 is detachably connected. Between the yoke ends and the intermediate element 58a and between the knuckles 68 and the outer elements 58a are suitable spacers 72. The pivot pin 69 is held in position and against endwise movement by nuts 73 threaded on its opposite ends. A suitable sleeve bushing may be interposed between the pivot pin 69 and the yoke ends, knuckles and spacers (see Fig. 6). The outer ends of the arms 60 are provided with suitable knuckles 74 through which a pivot pin or shaft 75 extends, this pivot pin also extending through aligned openings formed in rearwardly extending brackets 76 provided on the elements 58a at the angle of their upright and horizontal portions and serving to pivotally connect the arms 60 thereto. Between the knuckles 74 and the intermediate bracket 76 I provide sleeves 77 which space the arms 60 and maintain them close to or against the outer brackets 76 and maintain the intermediate element in position and against lateral movement, co-operating with the parts on the pivot pin 69 to insure this position. I also provide sleeve bushings between the pivot pin 75 and the knuckles 74 and spacing sleeves 77. Nuts 78 are threaded on the opposite ends of the pivot pin 75 to prevent its endwise movement. As shown, the shafts 69 and 75 are spaced a distance equal to the distance between the shafts 61, 62, so that when the pairs of arms swing about the latter shafts, the load carrying member will remain in a predetermined relation to the floor surface. When the support 31 is in what may be termed its normal position, as shown in Fig. 1, the portions 58a' of the load carrying member are horizontal and parallel to the floor and the swingable arms 59, 60, may be operated upwardly (see dotted lines in Fig. 1) and downwardly without changing this relationship. In operation, the cable 34 is paid out from the drum 21 which allows the arms 59, 60, to swing downwardly to the position shown in Fig. 1 and disposed the load supporting portions 58a' relatively close to the floor. The truck is then driven forwardly, the effect of which is to project these portions below the load. The cable 34 is then wound on the drum 21, the effect of which is to swing the arms 59, 60, upwardly to the desired height. The truck may then be driven to the place of discharge. The arms 59, 60, are then raised or lowered depending upon the position of the surface on which the load is to be discharged. The arms 59, 60, are then lowered to permit the load to engage its support and the truck driven rearwardly to disengage it. As the outer ends of the arms 59, 60, are movable through a relatively long arc, the truck may be used for tiering loads or for removing them when piled one on another or stored on an elevated support. Where the exterior shape of a load (such as a drum, paper roll and the like) or the character of the load permits it to be rolled or slid onto the load carrying member 58, the support 31 may be operated about its pivot to any desired extent, as shown in Fig. 3, the effect of which is to adjust the shafts 61, 62, relative to each other, that is, the upper shaft inwardly relative to the lower shaft, with the result that the load carrying member 58 is tilted rearwardly, which position it will occupy during swinging movement of the arms 59—59, 60—60. With the load carrying member adjusted to a tilted position as just described, it may be raised to position its outer end level with a platform A (see Fig. 3), from which the load may be moved onto the member 58. When desired, the member 58 may be positioned in the manner just described when the loads are piled one on another and the upper most ones are being successively removed. Where the load is of the character above mentioned and it is desired to dump the same by tilting of the carrying member 58, the latter is raised or lowered to operative relation with respect to the load receiving support and then the support 31 is swung outwardly to the position shown in Fig. 4, the effect of which is to adjust the shaft 61 outwardly relative to the shaft 62, with the result that the member 58 is tilted to disposed the portions 58a' downwardly.

In some instances, the load carrying member 58 may be tilted to incline its portions 58a' downwardly and outwardly, then the truck may be driven forwardly to project these portions below a load and cause the latter to ride up the portions 58a' and thereafter the support 31 may be swung inwardly to tilt the member in the opposite direction, thereby picking up the load. The load may be discharged by reversing the operations just described.

It will be understood that the member 58 may be tilted in either direction after it is moved to any desired vertical position and it may be tilted in either direction and then raised or lowered; also, it may be tilted in either direction when in any elevated position, then moved to another position and tilted in either direction; furthermore, the construction is such that the tilting in either direction may be at varying angles. In some instances to obtain a wide range of movements, it will be desirable to pivot the support 31 on or adjacent the free or outer end of the truck frame to give clearance to the arms 60. Where the support 31 is remote from the frame end, as shown, the arms 60 are bent intermediate their ends; also, the arms 60 are, by preference disposed in planes outside the arms 59 (see Fig. 2) so that they will clear each other when swung to their extreme positions.

By mounting the arms 59—59, 60—60, on a pivoted support, instead of a stationary support, the outer portion of the load engaging member 58 may be raised to a greater height and lowered to a position below the plane of the floor engaged by the wheels 4, 5. Accordingly, by shaping the brackets 76 to position the portions 58a, 58a', vertically and horizontally, respectively, or in normal operating position, when the support 31 is at some predetermined angle of inclination other than that shown in Figs. 1, 2, 3 and 4, loads on dunnage may be engaged or loads discharged on dunnage on levels below the floor level on which the truck operates.

It will be noted that the operating member 37 for the raising and lowering means 57 is carried by the movable support 31 so that its operative relation to the raising and lowering means is not affected by the swinging of the support to adjust the supporting shafts 61, 62, to tilt the load carrying member as above described.

79 indicates as an entirety a limit switch mechanism arranged to open the circuit to the driving motor for the shaft 27 when the frame 19 in rotating in either direction reaches a predetermined position. The switch mechanism 79 includes a pair of switches within a casing 79a and a device for opening either switch according to the direction of movement of the frame 19. 80 indicates as an entirety a limit switch mechanism for opening the circuit to the motor 23 when the support 31, in swinging about its pivot 30 in either direction, reaches a predetermined position. The mechanism 80 comprises a casing 80a enclosing a pair of switches through one of which the current flows when the support 31 swings in either direction. The switches are controlled by a rod 80b pivotally connected to the support 31.

81 indicates as an entirety a limit switch mechanism arranged to open the circuit to the motor 23 when the load carrying member 58 is raised to a predetermined position. The mechanism 81 comprises a casing 81a enclosing a switch through which the current flows when the load carrying member 58 is raised, a device for opening the switch connected to an arm 81b, a cable 81c connected at its inner end to the arm 81b and at its outer end extending to the outer end of the support 31 and depending therefrom and carrying a weight 81d, which, through the cable 81c and arm 81b, maintains the device in in-operative position and the switch closed. The weight 81d is disposed in the path of movement of the casing 35a for the sheave 35, so that when the latter is raised to a predetermined position the casing 35a will move the weight upwardly and allow the switch opening device to operate under the influence of a spring (not shown), thereby opening the circuit and stopping the motor 23. The switches and the operating devices therefor within the casings 79a, 80a and 81a may be similar to like parts shown in Letters Patent No. 1,726,717, dated September 3, 1929, granted to me, for which reason no claim to these mechanisms are made herein.

In Figs. 9 to 15, inclusive, I show a slightly different form of construction in which the swingable parallel arms for the load carrying member 58' swing about non-adjustable shafts. In these views the main frame and the wheels therefor and driving and control means for the truck may be similar to like parts shown in Figs. 1 to 8; also the battery frame 19' and its mounting and the operating means for the frame may be similar to the frame 19 and the mounting and operating means therefor already referred to.

59'—59', 60'—60', indicate pairs of upper and lower arms pivoted at their inner ends on the frame 19' in the following manner: 82 indicates a pair of plates secured to the upper portions of the uprights 24' and suitably braced by struts 83 connected to uprights 20'. The plates 82 are formed with aligned openings to receive and support a shaft 61', on which the inner ends of the arms 59'—59' are pivoted. 84 indicates a pair of spaced plates mounted on the base portion of the frame 19' and extending forward of the uprights 24' and shaft 18' and formed with aligned openings to receive and support a shaft 62', on which the inner ends of the arms 60'—60' are pivoted. The outer ends of the arms 59' are pivoted to the vertical portions of the load carrying member 58' substantially similar to the pivoting of the arms 59 to the member 58, except that the lift yoke is omitted for reasons which will later appear; and the outer ends of the arms 60' are pivoted to the member 58' substantially similar to the pivoting of the arms 60 to the member 58, except that the brackets 76 are omitted and the connecting shaft 75' is mounted in openings formed in the walls of the angles of the member 58'.

85 indicates the means for swinging the arms 59', 60' upwardly and downwardly. The means 85 comprise a pair of drums 86, 87, on which a pair of cables 86a, 87a wind or unwind, respectively, according to the direction of rotation of the motor 23'. The cables 86a, 87a, first reeve around sheaves 88, loosely mounted on a shaft 89, suitably supported by the plates 82; then around sheaves 90 loosely mounted on a shaft 91, suitably supported at its opposite ends by the arms 60'; then around sheaves 92 loosely mounted on the shaft 89; and then around sheaves 93 loosely mounted on the shaft 91; the free ends of the cables being connected to an equalizer 94. From the foregoing description, it will be seen that rotation of the drums 86, 87, in the direction to wind the cables thereon will effect swinging of the arms 59', 60', upwardly, and the arms in turn will raise the load carrying member 58'; whereas rotation of the drums in the opposite direction will move these parts downwardly.

While the arms 59', 60', may be swung upwardly and downwardly by the use of one cable, I prefer to use two cables as shown herein and already described. In the use of two cables it will be understood that the drums 86, 87, rotate together in either direction. In this arrangement, the motor 23' transmits power direct to both shaft sections to which the drums 86, 87, are connected and therefore a differential mechanism, clutches therefor and release means for the latter are not required.

By mounting the load carrying member 58' on swingable arms, it may be moved to a position below the level or surface supporting the wheels 4', 5'. Where the shafts 61', 62', are supported in a plane adjacent the front end of the truck frame, instead of at a point remote therefrom as shown, the supporting arms may swing downwardly a greater distance and thus position the load carrying member for engaging or discharging loads at a lower level.

From the foregoing description it will be noted that a truck embodying my invention may be economically used for tiering loads and removing loads piled one on another and that it may be used for transferring loads to and from elevated supports and for transporting loads from one station to another station.

To those skilled in the art to which my invention relates, many changes in construction and widely differing embodiments and applications of the invention will suggest themselves without departing from the spirit and scope thereof. My disclosures and the description herein are purely illustrative and not intended to be in any sense limiting.

What I claim is:

1. In apparatus of the class described, the combination of a wheel mounted frame, a vertical shaft thereon, a frame rotatably mounted on said shaft, a support pivotally mounted on said last mentioned frame to swing in a vertical plane, spaced upper and lower horizontal shafts carried by said support, arms pivotally mounted at their inner ends on said horizontal shafts, a load carrying member comprising an L-shaped device having its vertical portion pivotally connected to the outer ends of said arms, means for swinging said arms about said shafts, and means for moving said support about its pivot.

2. In apparatus of the class described, the combination of a wheel mounted frame, a support pivoted at its lower end on said frame on a horizontal axis, a pair of spaced upper and lower shafts on said support, arms pivotally mounted at their inner ends on said shafts, an L-shaped load carrying device having the upper end of its vertical portion pivotally connected to the upper arm and its lower portion pivotally connected to the other arm, said support being movable to effect relative movement between said arms, and means for raising and lowering said arms.

3. In apparatus of the class described, the combination of a wheel mounted frame, a support pivoted at its lower end on said frame on a horizontal axis, a pair of spaced upper and lower shafts on said support, arms pivotally mounted at their inner ends on said shafts, an L-shaped load carrying device having the upper end of its vertical portion pivotally connected to the upper arm, a bracket at the lower end of said vertical portion pivotally connected to the other arm, said support being movable to effect relative movement between said arms, and means for raising and lowering said arms, said support being movable in any position of said arms.

4. In apparatus of the class described, the combination of a wheel mounted frame, a support swingable in a vertical plane on said frame, a member for elevating loads, swingable pantographic connections between said member and said support arranged to maintain said member in a predetermined relation to the horizontal as said connections swing relative to said support, means for swinging said support, and means for swinging said connections.

5. In apparatus of the class described, the combination of a wheel mounted frame, a support swingable in a vertical plane on said frame, a member for elevating loads, swingable pantographic connections between said member and said support arranged in a predetermined relation to the horizontal as said connections swing relative to said support, means for swinging said support, and means for swinging said connections, the last said means being operable from the upper portion of said support.

6. In apparatus of the class described, the combination of a wheel mounted frame, a support swingably mounted at its lower end on said frame, a member for raising and lowering loads, a pair of upper and lower links disposed laterally one from the other and pivoted to said support above its lower end and pivotally connected at their outer ends to said member, means for swinging said support about its pivot, and means suspended from the upper portion of said support for swinging said arms.

7. In apparatus of the class described, the combination of a wheel mounted frame, a vertical shaft thereon, a frame rotatably mounted on said shaft, a support pivotally mounted on said last mentioned frame to swing in a vertical plane, spaced upper and lower arms pivotally mounted at their inner ends on said support, a load carrying member comprising a device having a vertical portion pivotally connected to the outer ends of said arms, means for swinging said arms about the pivots at the inner ends thereof, and means for moving said support about its pivot.

8. In apparatus of the class described, the combination of a wheel mounted frame, a support pivoted at its lower end on said frame on a horizontal axis, a pair of spaced upper and lower arms pivotally mounted at their inner ends on said support, a load carrying device having a vertical portion, the upper end of such portion being pivotally connected to the outer end of the upper arm and its lower end being pivotally connected to the outer end of the other arm, said support being movable to effect relative movement between said arms, and means for raising and lowering said arms.

9. In an industrial truck, the combination of a wheel mounted frame, a load carrying member, means between said frame and said member for supporting the latter to swing upwardly and downwardly, said means including a support pivotally mounted on said frame to swing in a vertical plane and upper and lower parallel arms pivotally connected at their outer ends to said member, the inner end of one of said arms being pivotally connected to said support, means suspended from the upper portion of said support for swinging said arms, and means for moving said support about its pivot.

In testimony whereof, I have hereunto affixed my signature.

EDWARD H. REMDE.